(12) United States Patent
Kitai et al.

(10) Patent No.: US 6,705,417 B2
(45) Date of Patent: Mar. 16, 2004

(54) STRADDLE TYPE FOUR-WHEELED ALL-TERRAIN VEHICLE WITH VARIABLE-SPEED V-BELT DRIVE

(75) Inventors: Haruo Kitai, Akashi (JP); Hiroyuki Fujimoto, Mitsuo-Cho (JP); Masao Mikasa, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/077,776

(22) Filed: Feb. 20, 2002

(65) Prior Publication Data

US 2002/0112905 A1 Aug. 22, 2002

(30) Foreign Application Priority Data

Feb. 22, 2001 (JP) .......................... 2001-046623

(51) Int. Cl.[7] ............................... B60K 11/06
(52) U.S. Cl. .................... 180/68.1; 180/366; 123/41.62
(58) Field of Search ............... 180/68.1, 68.2, 180/366, 229; 123/41.59, 41.62, 41.65, 41.86

(56) References Cited

U.S. PATENT DOCUMENTS

| 4,483,686 A | * | 11/1984 | Kobayashi et al. | ........... 474/11 |
| 4,697,665 A | * | 10/1987 | Eastman et al. | ............ 180/230 |
| 4,712,629 A | * | 12/1987 | Takahashi et al. | ......... 180/68.1 |
| 4,744,432 A | * | 5/1988 | Shibata et al. | ............. 180/68.1 |
| 5,715,904 A | * | 2/1998 | Takahashi et al. | .......... 180/229 |
| 5,976,044 A | * | 11/1999 | Kuyama | ...................... 474/93 |
| 6,155,371 A | * | 12/2000 | Izumi | .......................... 180/292 |
| 6,267,700 B1 | * | 7/2001 | Takayama | .................... 474/93 |
| 6,454,040 B1 | * | 9/2002 | Fukuda | ........................ 180/374 |
| 6,499,443 B2 | * | 12/2002 | Kawamoto et al. | ...... 123/41.44 |

FOREIGN PATENT DOCUMENTS

| JP | A 10-110813 | 4/1998 |
| JP | A 10-297313 | 11/1998 |

* cited by examiner

*Primary Examiner*—Brian L. Johnson
*Assistant Examiner*—Brian L Swenson
(74) *Attorney, Agent, or Firm*—Oliff & Berridge

(57) ABSTRACT

A straddle type four-wheeled all-terrain vehicle includes: an engine mounted on a body frame and disposed between front wheels and rear wheels, having a crankcase; a variable-speed V-belt drive disposed on a side of the crankcase and covered with a V-belt drive cover, the V-belt drive cover having an upper wall provided with a cooling air discharge port opening upward; and a cooling air exhaust duct disposed within a right-and-left width of the body frame. The cooling air exhaust duct communicates with the cooling air discharge port and has an air outlet located in front of a seat so that a cooling air is discharged through the air outlet into a space under the seat. Cooling air is discharged through the air outlet of the cooling air exhaust duct into a space under the seat.

12 Claims, 8 Drawing Sheets

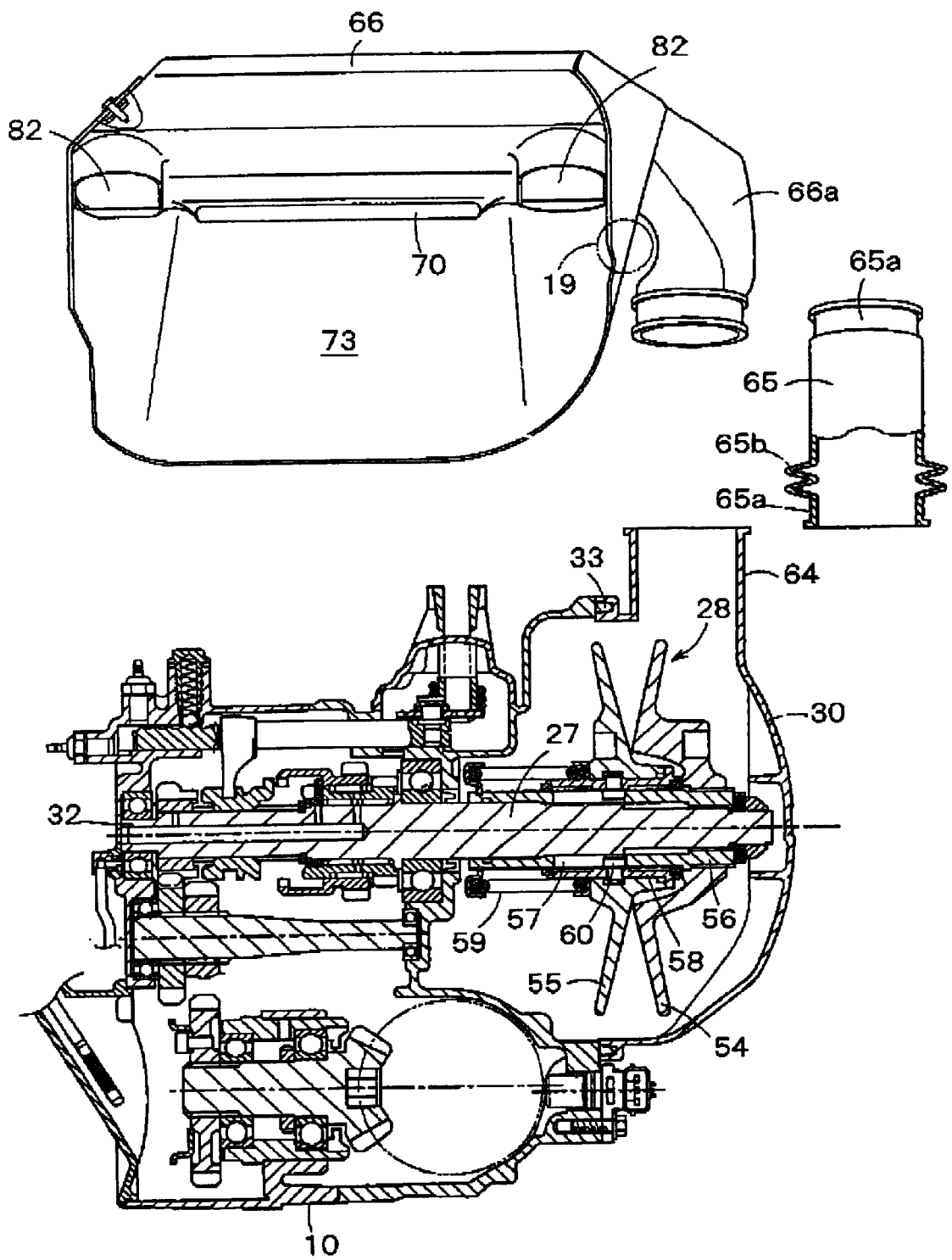
F I G. 5

STRADDLE TYPE FOUR-WHEELED ALL-TERRAIN VEHICLE WITH VARIABLE-SPEED V-BELT DRIVE

BACKGROUND OF THE INVENTION

1. Field of the Invention

The present invention relates to a straddle type four-wheeled all-terrain vehicle and, more particularly, to a straddle type four-wheeled all-terrain vehicle with a variable-speed V-belt drive which is disposed on a side of a crankcase of an engine.

2. Description of the Related Art

In a straddle type four-wheeled all-terrain vehicle with a variable-speed V-belt drive covered with a v-belt drive cover, a V-belt, a drive pulley and a driven pulley included in the variable-speed V-belt drive must be cooled by forced cooling. A conventional cooling mechanism forms a cooling air inlet and a cooling air outlet in the v-belt drive cover, and uses the drive pulley or the like with cooling fins of the variable-speed V-belt drive as a tan rotor to ventilate a space covered with the V-belt drive cover. The cooling air outlet is connected to a cooling air exhaust duct. The cooling air exhaust duct is extended under a seat to a position behind the seat to avoid exposing the rider to the cooling air.

On the other hand, as shown in FIG. 9, a cooling mechanism for a variable-speed V-belt drive, disclosed in JP-A 110813/1998 includes a cooling air exhaust duct 211 connected to a rear end part of a V-belt drive cover 200, curved so as to extend upward behind an engine and opening into a space under a seat 210. More specifically, the V-belt drive cover 200 is provided with a cooling air inlet 201 and a cooling air outlet 202 in a front part and a rear part thereof, respectively. A suction duct 206 has a lower end connected to the cooling air inlet 201 and an upper end opening into a space around the lower end of a steering shaft under a front fender 205, and extends upward from the cooling air inlet 201 of the V-belt drive cover 200. A rear segment of the cooling air exhaust duct 211 connected to the cooling air outlet 202 is curved so as to extend upward behind the engine and has an upper open end 211a opening forward into a space under the seat 210.

The straddle type four-wheeled all-terrain vehicle runs about frequently on rugged ground, roads pitted with puddles and seashore. Therefore, the cooling air exhaust duct of the former cooling mechanism extending at a low level beyond the rear end of the seat is liable to be collided with stones and the like. Moreover, mud and water is liable to enter the cooling air exhaust duct through an air outlet thereof.

A rear segment of the cooling air exhaust duct 211 of the latter cooling mechanism shown in FIG. 9 extends upward behind the engine. Therefore, the engine places restrictions on the position of the cooling air outlet 211a of the cooling air exhaust duct 211. Moreover, the rear segment extending behind the engine places restrictions on the arrangement of accessories behind the engine.

Since the upper open end 211a of the cooling air exhaust duct 211 opens toward the front, cooling air is discharged forward against wind. Therefore, hot cooling air is liable to flow around the rider's foot to spoil riding comfort.

SUMMARY OF THE INVENTION

Accordingly, it is an object of the present invention to prevent mud and water from entering a cooling air exhaust duct connected to a V-belt drive cover covering a variable-speed V-belt drive of a straddle type four-wheeled all-terrain vehicle, to avoid spoiling riding comfort by discharged cooling air, and to secure a space for installing accessories behind the V-belt drive cover.

According to the present invention, a straddle type four-wheeled all-terrain vehicle comprises: a body frame; an engine mounted on the body frame and disposed between front wheels and rear wheels, the engine having a crankcase; a variable-speed v-belt drive disposed on a side of the crankcase and covered with a V-belt drive cover, the V-belt drive cover having an upper wall provided with a cooling air discharge port, the cooling air discharge port opening upward; and a cooling air exhaust duct disposed within a right-and-left width of the body frame, the cooling air exhaust duct communicating with the cooling air discharge port, the cooling air exhaust duct having an air outlet located in front of a seat so that a cooling air is discharged through the air outlet into a space under the seat.

Accordingly, the air outlet of the cooling air exhaust duct is positioned at a high level and is surrounded by the engine and the seat, so that mud and water are prevented from entering the cooling air exhaust duct. Therefore, the cooling air discharged from the cooling air exhaust duct can quickly flow rearward under the seat without flowing toward the rider's foot, and hence cooling air can be prevented from spoiling riding comfort. Since the cooling air discharge port is formed on the upper wall of the V-belt drive cover so as to open upward, a space behind the V-belt drive cover can be effectively used.

Preferably, the engine is a two-cylinder v-engine having a front cylinder and a rear cylinder. The air outlet of the cooling air exhaust duct is located in front of a space between the rear cylinder and the seat so as to discharge the cooling air into the space.

Accordingly, a space in the body frame can be effectively used to form a cooling air exhaust passage for the variable-speed V-belt drive even though the front and the rear cylinders of the two-cylinder v-engine are arranged so as to extend back and forth.

Preferably, the straddle type four-wheeled all-terrain vehicle further comprises a connecting duct interposed between the cooling air discharge port of the V-belt drive cover and the cooling air exhaust duct, the connecting duct being detachably connected to the cooling air discharge port and the cooling air exhaust duct.

Accordingly, parts, such as spark plugs, of which accessibility is degraded by being covered with the connecting duct, can be easily inspected only by removing the connecting duct without removing the cooling air exhaust duct even though the air outlet of the cooling air exhaust duct is disposed in front of the space between the rear cylinder and the seat.

Preferably, the straddle type four-wheeled all-terrain vehicle further comprises a baffle plate connected to the air outlet of the cooling air exhaust duct and extending substantially along an upper surface of the rear cylinder so as to form a cooling air exhaust passage between the baffle plate and the seat through which the cooling air flows rearward.

Accordingly, the cooling air discharged from the cooling air exhaust duct can be further smoothly guided rearward, and the leakage of the cooling air which spoils riding comfort can be further effectively prevented.

BRIEF DESCRIPTION OF THE DRAWINGS

The above and other objects, features and advantages of the present invention will become more apparent from the following description taken in connection with the accompanying drawings, in which:

FIG. 5 is a sectional view taken on line V—V in FIG. 3;

DESCRIPTION OF THE PREFERRED EMBODIMENTS

Figure 1:
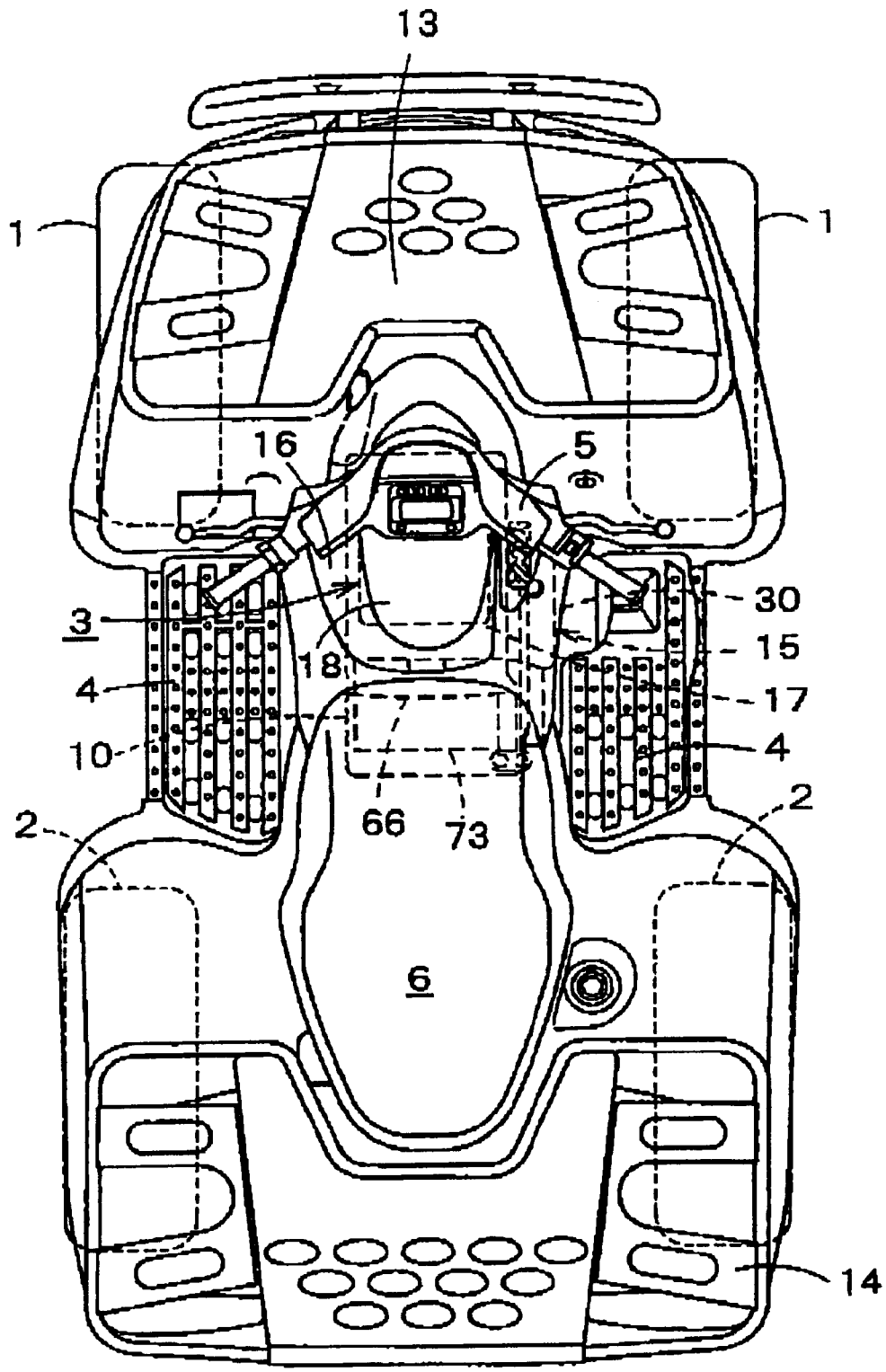
FIG. 1 is a plan view of a straddle type four-wheeled all-terrain vehicle with a variable-speed V-belt drive in a preferred embodiment according to the present invention.

A straddle type four-wheeled all-terrain vehicle (hereinafter referred to simply as "all-terrain vehicle") provided with a variable-speed V-belt drive in a preferred embodiment will be described with reference to FIGS. 1 to 8. In these figures, words "right", "left", "front", "rear" and the like signify positional and directional attributes as a rider riding the all-terrain vehicle sees.

The all-terrain vehicle has front wheels 1, rear wheels 2, an engine 3 disposed between the front wheels 1 and rear wheels 2. with a crankcase 10. A gear type transmission is built in a rear part of a crankcase 10 of the engine 3. A variable-speed V-belt drive 15 is disposed on a right-hand side of the engine 3.

Steps 4 and a side cover are disposed between a front fender 13 covering the front wheels 1, and a rear fender 14 covering the rear wheels 2. The steps 4 are disposed on the opposite sides of the engine 3, respectively. The side cover 16 covers the engine from above. A seat 6 is disposed behind the side cover 16. The seat 6 extends to a middle part with respect to a back-and-forth direction of the rear fender 14. A handlebar 5 is disposed near the rear edge of the front fender 13. An air cleaner case 17 is disposed above the engine 3 in a space under the side cover 16. The side cover 16 has an upper wall provided with an opening, and the opening of the side cover 16 is covered with an air cleaner cover 18 detachably attached to the side cover 16.

Figure 7:
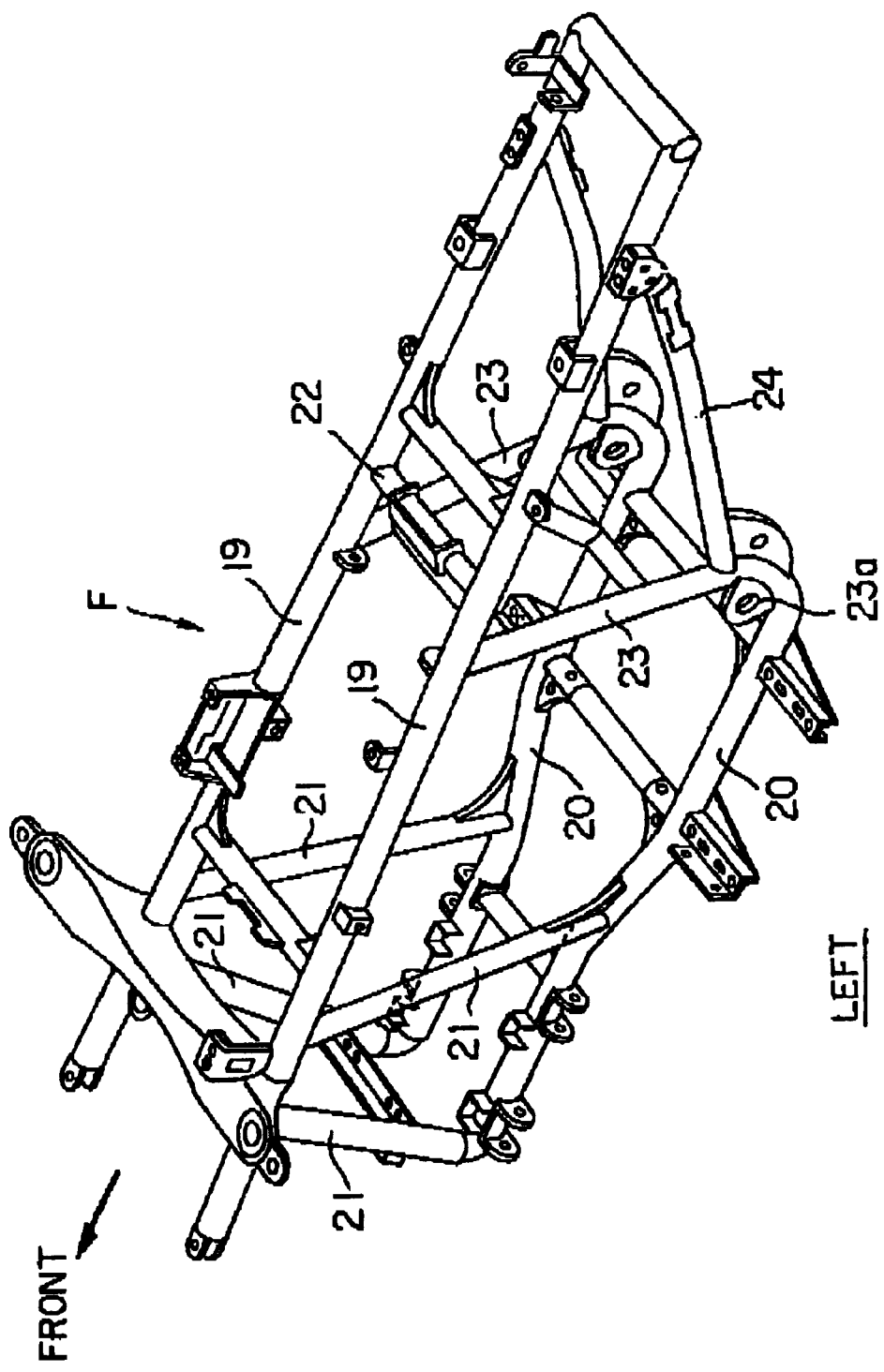
FIG. 7 is a perspective view of the body frame.
Figure 8:
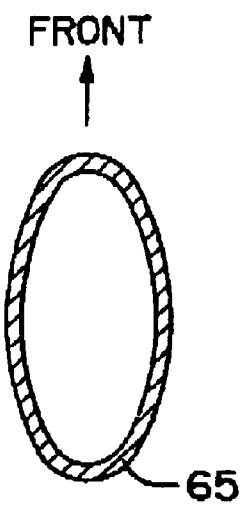
FIG. 8 is a sectional view of a connecting duct.
Figure 9:
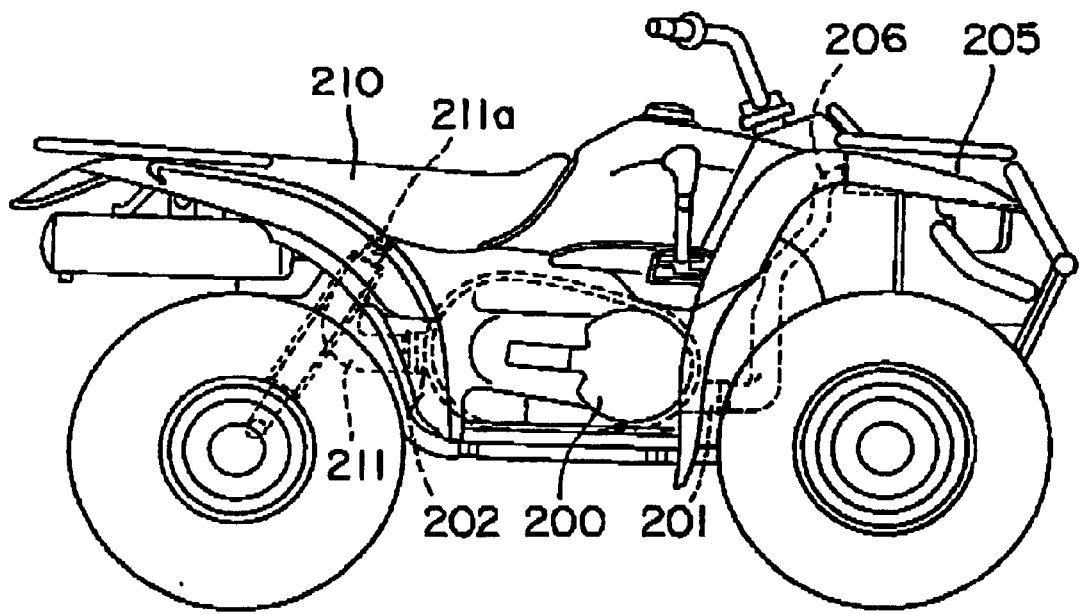
FIG. 9 is a side elevation of a conventional straddle type four-wheeled all-terrain vehicle.

Referring to FIG. 7, the body frame F comprises right and left top tubes 19 extending back and forth, right and left down tubes 20 extending back and forth, front tubes 21 obliquely extended between the front end parts of the right and the left top tubes 19 and the front end parts of the right and the left down tubes 20, respectively, so as to diverge from each other downward, and cross tubes 22 extended between the right and the left top tubes 19 and between the right and the left down tubes 20, respectively. Those tubes 19, 20, 21 and 22 are welded together to build the body frame F. Rear parts of the down tubes 20 are curved to form curved parts, and up tubes 23 integral with the down tubes 20 extend obliquely forward from the curved parts. The upper ends of the up tubes 23 are welded to the top tubes 19.

Housings 23a for supporting a swing arm supporting the rear wheels 2 are held on the curved parts of the down tubes 20. Rear support tubes 24 have lower front ends welded to the curved parts of the down tubes 20 and extend obliquely rearward. Rear ends of the rear support tubes 24 are welded to the rear ends of the top tubes 19.

Figure 2:
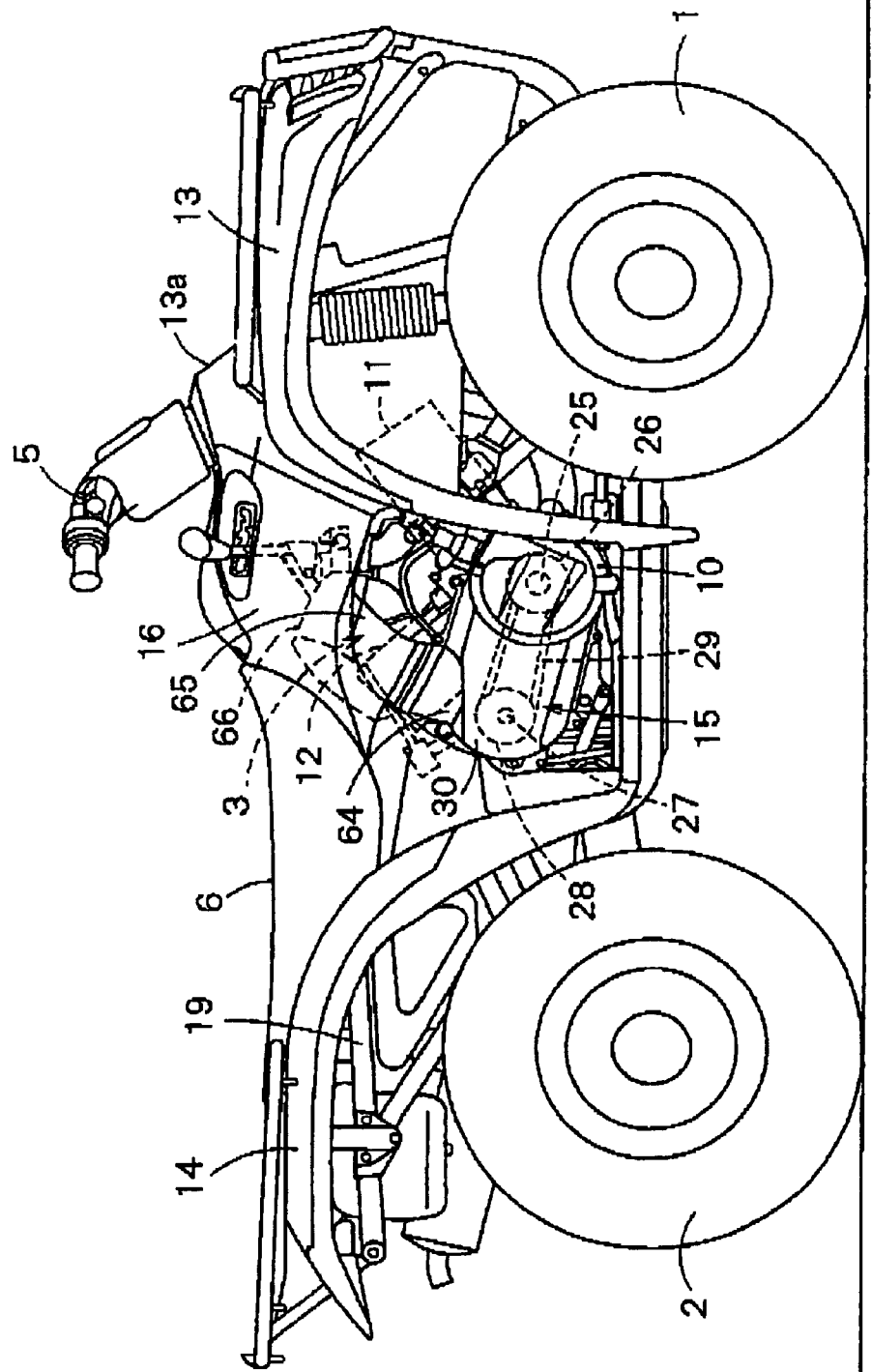
FIG. 2 is a side elevation of the straddle type four-wheeled all-terrain vehicle shown in FIG. 1 as viewed from the right side.

Referring to FIG. 2, the engine 3 is a two-cylinder v-engine having a front cylinder 11 disposed on the crankcase 10 so as to tilt forward, and a rear cylinder 12 disposed on the crankcase 10 so as to tilt rearward. The variable-speed V-belt drive 15 includes a front drive pulley 26, a rear driven pulley 28, and a v belt 29 extended between the drive pulley 26 and the driven pulley 28. The variable-speed V-belt drive 15 is covered with a V-belt drive cover 30 detachably attached to a side wall of the crankcase 10.

[Variable-Speed V-belt Drive]

Figure 6:
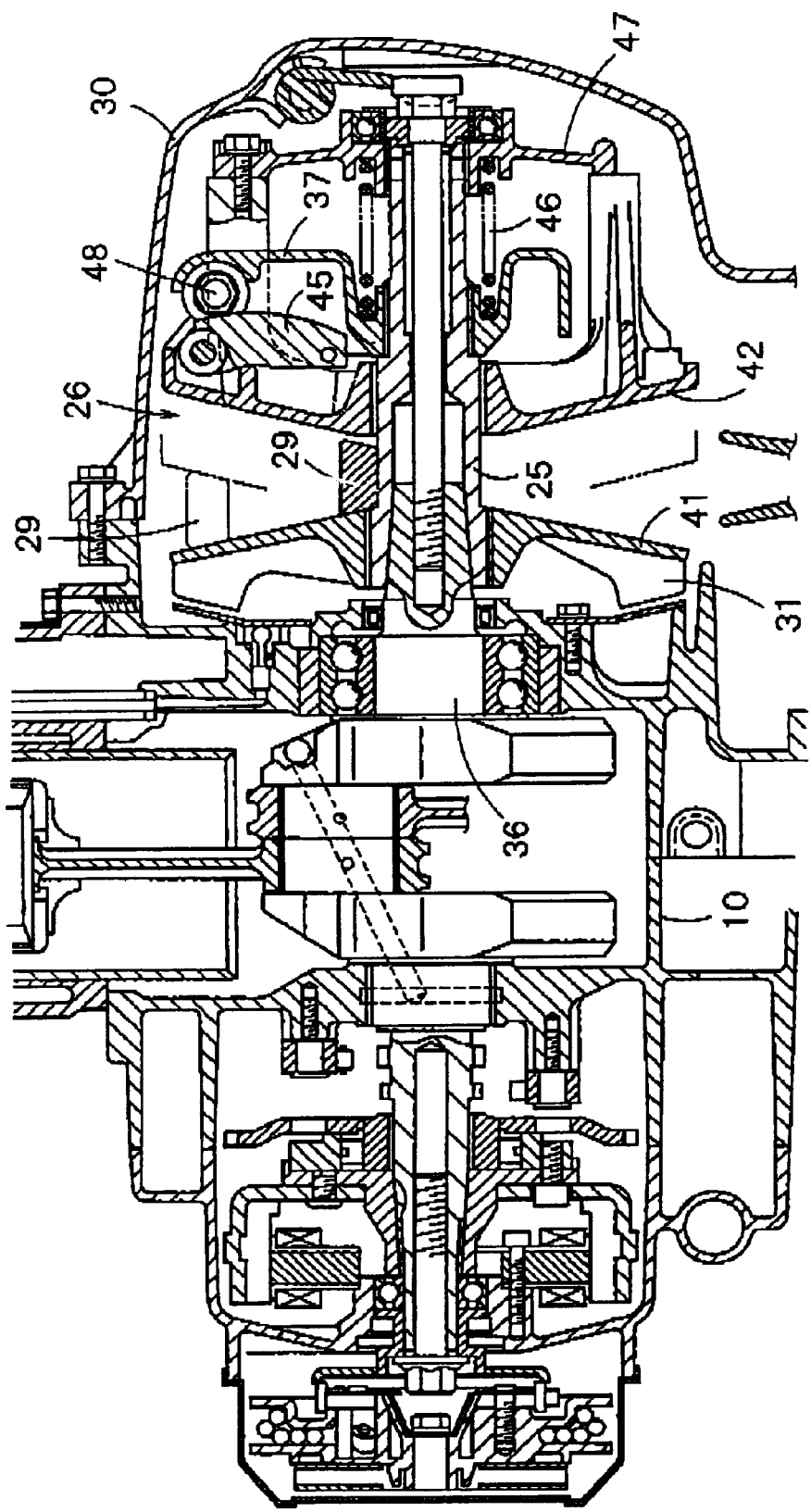
FIG. 6 is a vertical sectional view of a part of the variable-speed v-belt drive around a drive pulley.

Referring to FIG. 6 showing the drive pulley 26 and the associated parts of the variable-speed V-belt drive 15 in a sectional view, a drive shaft 25 is connected to a right end part of a crankshaft 36. The drive pulley 26 includes a fixed sheave 41 fixedly mounted on the drive shaft 25, and a movable sheave 42 axially slidably mounted on the drive shaft 25. A thrusting mechanism including a spider 37, a plurality of flyweights 45, pressure regulating spring 46 biasing the movable sheave 42 away from the fixed sheave 41, and a support plate 47 is disposed on the back side of the movable sheave 42. As engine speed increases, the flyweights 45 turn on the pins to press the movable sheave 42 toward the fixed sheave 41 against the resilience of the pressure regulating springs 46 to reduce the speed reducing ratio of the variable-speed V-belt drive 15.

Cooling fins 31 are formed on the back side of the fixed sheave 41. The cooling fins 31 serves as fan blades for sucking cooling air into a space covered with the V-belt drive cover 30.

Referring to FIG. 5 showing the driven pulley 28 of the variable-speed V-belt drive 15 and a transmission case, which is a part of the crankcase 10, in a vertical sectional view, a driven shaft 27 is formed integrally with an input shaft 32 included in the gear type transmission. The driven pulley 28 has a fixed sheave 54 on the right side and a movable sheave 55 on the left side. A pressure regulating mechanism includes a fixed sleeve 56 fixedly mounted on the driven shaft 27, a sleeve 58 axially slidably mounted on the fixed sleeve 56 and fastened to the movable sheave 55, rollers 60 supported on the sleeve 58, and pressure regulating springs 29 biasing the movable sheave 55 toward the fixed sheave 54. The rollers 60 are engaged in a helical cam groove 57 formed in the fixed sleeve 56.

The V-belt drive cover 30 is fastened to the right side wall of the crankcase 10 with a gasket 33 compressed between the side wall of the crankcase 10 and the V-belt drive cover 30 to seal the joint of the side wall of the crankcase 10 and the v-belt drive cover 30 hermetically.

[Cooling Mechanism in V-belt Drive Cover]

Figure 3:
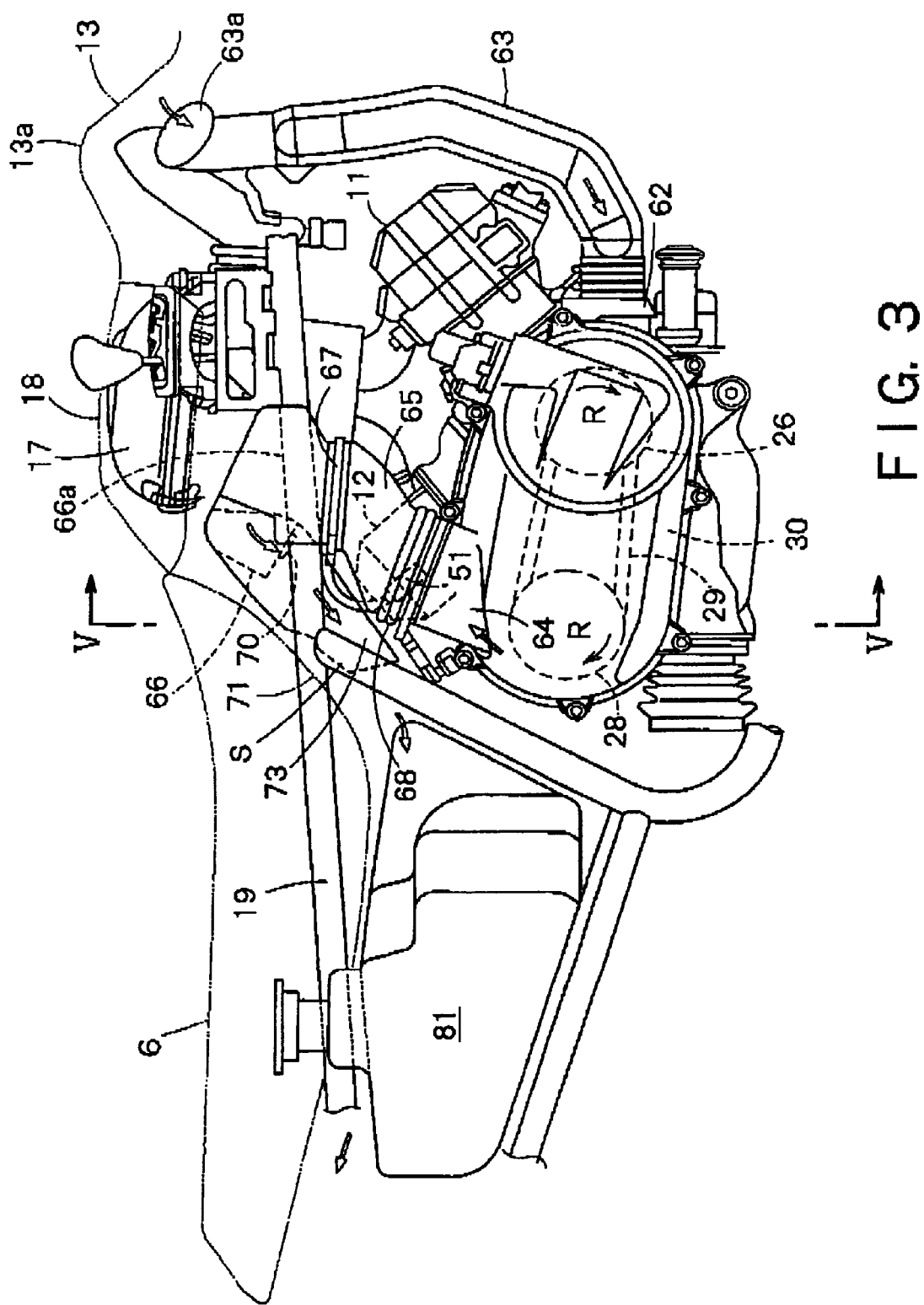
FIG. 3 is a side elevation of a body frame included in the straddle type four-wheeled all-terrain vehicle shown in FIG. 1 and parts held on the body frame as viewed from the right side, in which a fender and the associated parts are removed.

Referring to FIG. 3 showing a right-hand part of the engine 3 in an enlarged view, the drive pulley 26 and the driven pulley 28 rotate in the direction of the arrows R. The V-belt drive cover 30 has an elliptical shape elongating back and forth and having opposite semicircular end parts. A cooling air suction port 62 is formed integrally with a front end part of the v-belt drive cover 30. A suction pipe 63 is connected to the cooling air suction port 62. The suction pipe 63 extends upward in front of the front cylinder 11 of the engine 3. The upper open end 63a of the suction pipe 63 opens into a space defined by a bulge 13a formed in a rear end part of the front fender 13.

A cooling air discharge port 64 is formed in a rear end part of the upper wall of the v-belt drive cover 30. The cooling air discharge port 64 projects from the V-belt drive cover 30 in a slightly forward tilted position.

An inlet pipe 66*a* formed integrally with a cooling air exhaust duct 66 is connected to the cooling air discharge port 64 by a rubber connecting duct 65. The connecting duct 65 is inclined obliquely forward. The upper and the lower end of the connecting duct 65 are detachably connected and fastened with hose bands 67 and 68 to the inlet end of the cooling air exhaust duct 66 and the cooling air discharge port 64, respectively. Thus, only the connecting duct 65 can be removed without removing the cooling air exhaust duct 66 and the V-belt drive cover 30 with the result that the inspection of the spark plug 51 of the rear cylinder 12 is facilitated.

Figure 4:
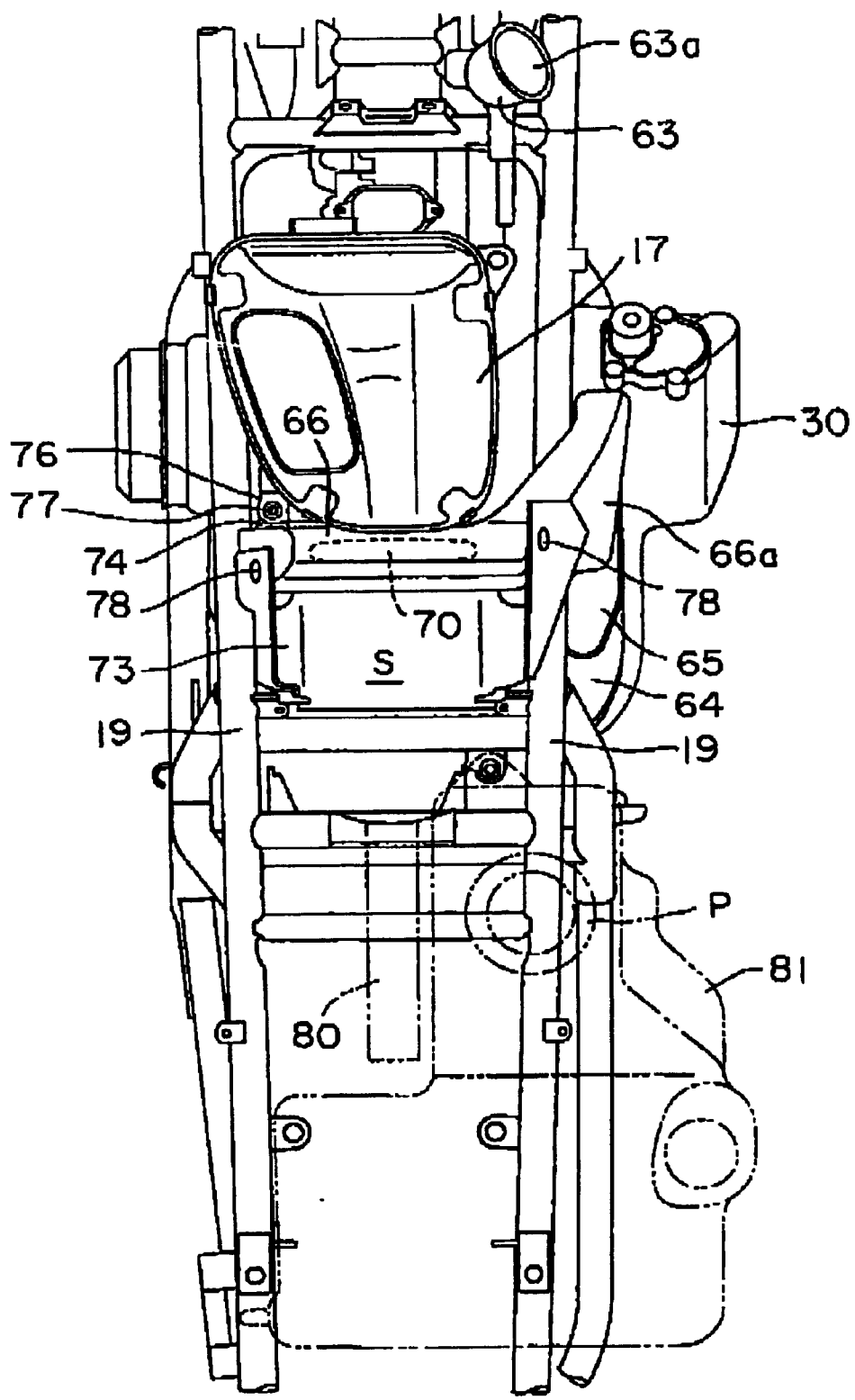
FIG. 4 is a plan view of the body frame and the parts shown in FIG. 3, in which a fender and the associated parts are removed.

As shown in FIG. 4, a main part of the cooling air exhaust duct 66 is disposed between the right and the left top tubes 19 of the body frame F. The cooling air exhaust duct 66 has an air outlet 70 opening obliquely downward toward the rear into an inclined space S declining toward the rear and extending between a bottom plate 71 attached to a front part of the lower surface of the seat 6 and inclined upward toward the front and an upper part of the rear cylinder 12.

A baffle plate 73 having a U-shaped cross section is connected to the air outlet 70. The baffle plate 73 declines rearward along the upper end surface of the rear cylinder 12. The baffle plate 73 and the bottom plate 71 of the seat 6 surround the space S to define an air passage through which cooling air is able to flow smoothly obliquely downward.

Referring to FIG. 4, the cooling air exhaust duct 66 is disposed near the rear end of the air cleaner case 17. The cooling air exhaust duct 66 has a shape elongating in the right-and-left direction and extends between the right and the left top tube 19 of the body frame F. The inlet pipe 66*a* is formed integrally with a right end part of the cooling air exhaust duct 66. The inlet pipe 66*a* extends in the right-and-left direction beyond the right top tube 19 and rests on the right top tube 19. A lug 74 projecting from a left end part of the cooling air exhaust duct 66 is fastened to a bracket 76 formed on the left top tube 19 with a bolt 77. The air outlet 70 has a small width back and forth and is elongating in the right-and-left direction so as to discharge cooling air directionally from the cooling air exhaust duct 66.

The baffle plate 73 is formed by bending opposite side parts of a flexible rubber plate upward in the shape of a trough. Right and left side parts of a front end part of the baffle plate 73 are fastened to the right and left end walls of the cooling air exhaust duct 66 with rivets 78.

A rear suspension 80 for suspending the rear wheels 2 is disposed behind the baffle plate 73 at a middle position with respect to the width between the opposite side frames of the body frame F as indicated by imaginary lines in FIG. 4. An L-shaped fuel tank 81 is disposed so as not to interfere with the rear suspension 80. The fuel tank 81 has a rear part extending over the substantially entire width of the body frame F, and a front part extending back and forth on the right side of the rear suspension 80 near to the engine 3. The fuel tank 81 is provided with a built-in fuel pump P.

Referring to FIG. 5 showing the cooling air exhaust duct 66 in a rear view, auxiliary air outlets 82 are formed on the right and the left side of the air outlet 70. The cooling air exhaust duct 66 is formed of a rigid resin and the connecting duct 65 is formed of an elastic material, such as rubber. The connecting duct 65 is provided in its upper and lower end parts with annular grooves forming fastening parts 65*a*. The connecting duct 65 is provided with a bellows 65*b* on the upper side of the lower fastening part 65*a* to enhance the flexibility of the connecting duct 65. Although the baffle plate 73 is shown in a state interfering with the right top tube 19 in FIG. 5, when the flexible baffle plate 73 is actually mounted, the flexible baffle plate 73 bends along the right top tube 19.

Sections in a horizontal plane of the air inlet pipe 66*a* and the cooling air discharge port 64 of the V-belt drive cover 30 have elliptical shapes elongating back and forth, respectively. A section in a horizontal plane of the connecting duct 65 has an elliptical shape elongating back and forth as shown in FIG. 5. Thus, the air inlet pipe 66*a* and the connecting duct 65 do not protrude greatly to the right beyond the right top tube 19 and the passage for cooling air can be formed in a sufficiently large sectional area.

While the all-terrain vehicle is traveling, the drive pulley 26 of the variable-speed V-belt drive 15 shown in FIG. 6 is driven for rotation. Cooling air (the atmosphere) is sucked through the upper open end 63*a* of the suction pipe 63 into the space covered with the V-belt drive cover 30 by suction produced by the rotating fixed sheave 41 with the cooling fins 31 of the drive pulley 21.

The cooling air sucked into the space covered with the V-belt drive cover 30 is forced to flow by the drive pulley 26 provided with the cooling fins 31 and the driven pulley 28 rotating in the direction of the arrows R and the V belt 29 turning according to the rotation of the drive pulley 26 and the driven pulley 28 to cool the drive pulley 26, the driven pulley 28 and the V belt 29, and flows into the cooling air discharge port 64 positioned above the upper surface of the rear end of the V-belt drive cover 30. The cooling air discharged through the cooling air discharge port 64 flows through the connecting duct 65 and the cooling air exhaust duct 66, and flows through the air outlet 70 into the air passage (the space S).

Since the air passage (the space S) is surrounded by the baffle plate 73 and the bottom plate 71 of the seat 6, the cooling air discharged from the cooling air exhaust duct 66 flows obliquely downward toward the rear and flows rearward through a space between the fuel tank 81 and the lower surface 6 of the seat 6.

Referring to FIG. 3, when the spark plug 51 of the rear cylinder 12 is to be inspected, the connecting duct 65 is removed. When installing the cooling air exhaust duct 66 on the body frame F, the v-belt drive cover 30 is attached to the crankcase 10 of the engine 3, the cooling air exhaust duct 66 is fastened to the body frame F, and then the cooling air exhaust duct 66 is connected to the V-belt drive cover 30 by the connecting duct 65. The baffle plate 73 may be formed by working a rigid metal plate instead of by shaping the flexible rubber plate.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A straddle type four-wheeled all-terrain vehicle comprising:
   a body frame;
   a seat disposed on the body frame so that a rider can straddle on the seat;
   an engine mounted on the body frame and disposed between front wheels and rear wheels, the engine having a crankcase;

a variable-speed V-belt drive of the vehicle disposed on a side of the crankcase and covered with a V-belt drive cover, the V-belt drive being capable of changing a speed ratio between a drive pulley and a driven pulley thereof, the V-belt drive cover having a cooling air discharge port formed in a rear end part of an upper surface of the V-belt drive cover so as to open upwardly; and a cooling air exhaust duct disposed within a right-and-left width of the body frame and above the engine, the cooling air exhaust duct being connected to the cooling air discharge port with a connecting duct, the cooling air exhaust duct having an air outlet located in front of the seat, the air outlet opening rearwardly into a space defined between a lower surface of the seat and a rear surface of the engine so that a cooling air of the variable-speed V-belt drive of the vehicle is discharged through the air outlet into and through the space.

2. The straddle type four-wheeled all-terrain vehicle according to claim 1, wherein the connecting duct is detachably connected to the cooling air discharge port and the cooling air exhaust duct.

3. The straddle type four-wheeled all-terrain vehicle according to claim 2, wherein the connecting duct includes longitudinally flexible bellows at a longitudinally middle position thereof.

4. The straddle type four-wheeled all-terrain vehicle according to claim 1, wherein the body frame includes right and left top tubes extending in a back-and-forth direction, wherein the air outlet of the cooling air exhaust duct is disposed between the right and left top tubes of the body frame, and wherein the cooling air exhaust duct is provided with an inlet pipe extending over either the right top tube or the left top tube of the body frame and connected to the cooling air discharge port with the connecting duct at a side of the body frame.

5. The straddle type four-wheeled all-terrain vehicle according to claim 4, wherein the cooling air exhaust duct is fixed to either the right top tube or the left top tube of the body frame.

6. The straddle type four-wheeled all-terrain, vehicle according to claim 4, wherein the cooling air exhaust duct has a width extending between the right and left top tubes of the body frame, and wherein the air outlet of the cooling air exhaust duct has an elongated shape extending in a right-and-left direction between the right and left top tubes of the body frame.

7. The straddle type four-wheeled all-terrain vehicle according to claim 1, wherein the engine is a two-cylinder v-engine having a front cylinder and a rear cylinder, and wherein the air outlet of the cooling air exhaust duct is located in front of the space defined between an upper surface of the rear cylinder and a lower surface of a front portion of the seat, the space extending obliquely downward and rearward, the air outlet of the cooling air exhaust duct opening obliquely downward and rearward so as to discharge the cooling air into the space.

8. The straddle type four-wheeled all-terrain vehicle according to claim 7, wherein the connecting duct is detachably connected to the cooling air discharge port and the cooling air exhaust duct.

9. The straddle type four-wheeled all-terrain vehicle according to claim 8, further comprising a baffle plate connected to the air outlet of the cooling air exhaust duct and extending rearward and downward substantially along an upper surface of the rear cylinder so as to form a cooling air exhaust passage between the baffle plate and the seat through which the cooling air flows rearward behind the rear cylinder.

10. The straddle type four-wheeled all-terrain vehicle according to claim 7, further comprising a baffle plate connected to the air outlet of the cooling air exhaust duct and extending rearward and downward substantially along an upper surface of the rear cylinder so as to form a cooling air exhaust passage between the baffle plate and the seat through which the cooling air flows rearward behind the rear cylinder.

11. The straddle type four-wheeled all-terrain vehicle according to claim 10, wherein the baffle plate has a U-shaped section so as to surround the air outlet of the cooling air exhaust duct together with the lower surface of the seat above the engine.

12. The straddle type four-wheeled all-terrain vehicle according to claim 10, wherein the baffle plate is formed from a rubber plate.

* * * * *